US012400777B2

(12) United States Patent
Matsumoto

(10) Patent No.: US 12,400,777 B2
(45) Date of Patent: Aug. 26, 2025

(54) INSULATOR-COATED SOFT MAGNETIC POWDER, METHOD FOR PRODUCING INSULATOR-COATED SOFT MAGNETIC POWDER, DUST CORE, MAGNETIC ELEMENT, ELECTRONIC DEVICE, AND VEHICLE

(71) Applicant: SEIKO EPSON CORPORATION, Tokyo (JP)

(72) Inventor: Yasutaka Matsumoto, Suwa (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 18/163,929

(22) Filed: Feb. 3, 2023

(65) Prior Publication Data

US 2023/0253134 A1 Aug. 10, 2023

(30) Foreign Application Priority Data

Feb. 4, 2022 (JP) ................................ 2022-016190

(51) Int. Cl.

*H01F 1/26* (2006.01)
*H01F 1/24* (2006.01)
*H01F 1/36* (2006.01)
*H01F 3/08* (2006.01)

(52) U.S. Cl.

CPC ................ *H01F 1/26* (2013.01); *H01F 3/08* (2013.01)

(58) Field of Classification Search

CPC ..... H01F 1/24; H01F 1/26; H01F 1/36; H01F 1/1475; H01F 1/12

See application file for complete search history.

(56) References Cited

U.S. PATENT DOCUMENTS

| | | | | |
|---|---|---|---|---|
| 6,387,532 | B1 | 5/2002 | Atarashi et al. | |
| 11,798,738 | B2 | 10/2023 | Tadai et al. | |
| 2018/0043431 | A1* | 2/2018 | Araki | H01F 1/153 |
| 2021/0005566 | A1* | 1/2021 | Gambino | H01L 25/0657 |
| 2021/0027940 | A1* | 1/2021 | Tadai | H01F 27/2823 |

FOREIGN PATENT DOCUMENTS

| | | | |
|---|---|---|---|
| JP | H11-131102 | A | 5/1999 |
| JP | 2017-188680 | A | 10/2017 |
| JP | 2021-022609 | A | 2/2021 |

OTHER PUBLICATIONS

Bearing Works, (PTFE) Polytetrafluoroethylene datasheet (https://www.bearingworks.com/uploaded-assets/pdfs/retainers/ptfe-datasheet.pdf), 2 pages. (Year: 2023).*

Shimizu et al., "Complex Permittivity Measurements of a PTFE Substrate in W Band by the Cut-Off Circular Waveguide Method", 4 pages. (Year: 2011).*

* cited by examiner

*Primary Examiner* — Matthew E. Hoban
*Assistant Examiner* — Lynne Edmondson
(74) *Attorney, Agent, or Firm* — Harness, Dickey & Pierce, P.L.C.

(57) ABSTRACT

An insulator-coated soft magnetic powder contains: a soft magnetic powder; and an insulating film with which a particle surface of the soft magnetic powder is coated and which contains a fluorine compound, in which an average particle diameter of the soft magnetic powder is 1 μm or more and 15 μm or less, an average thickness of the insulating film is 5 nm or more and 50 nm or less, and a relative permittivity of the fluorine compound is 5.0 or less.

8 Claims, 6 Drawing Sheets

INSULATOR-COATED SOFT MAGNETIC POWDER, METHOD FOR PRODUCING INSULATOR-COATED SOFT MAGNETIC POWDER, DUST CORE, MAGNETIC ELEMENT, ELECTRONIC DEVICE, AND VEHICLE

The present application is based on, and claims priority from JP Application Serial Number 2022-016190, filed Feb. 4, 2022, the disclosure of which is hereby incorporated by reference herein in its entirety.

BACKGROUND

1. Technical Field

The present disclosure relates to an insulator-coated soft magnetic powder, a method for producing an insulator-coated soft magnetic powder, a dust core, a magnetic element, an electronic device, and a vehicle.

2. Related Art

JP-A-2017-188680 discloses a magnetic material containing: an iron-based soft magnetic powder including an inorganic insulating film at a surface thereof; and a fluororesin film formed at a surface of the inorganic insulating film. Among these, the fluororesin film is a composite fluororesin film including a modified fluorine coating film formed at the surface of the inorganic insulating film and a perfluoro fluororesin film formed at the modified fluorine coating film.

Such a fluororesin film has excellent heat resistance. Therefore, the magnetic material disclosed in JP-A-2017-188680 is suitable for producing a soft magnetic core to be attached to, for example, a heating coil portion of a high-frequency quenching device.

In recent years, a soft magnetic core is often used in a high frequency range. In a high frequency range, an eddy current is generated due to a change in a magnetic field generated inside the soft magnetic core, which causes an eddy current loss. One of factors for reducing the eddy current is a permittivity of an insulating film with which surfaces of particles of a soft magnetic powder are coated. By lowering the permittivity, the eddy current can be reduced.

In the magnetic material disclosed in JP-A-2017-188680, the inorganic insulating film is formed at the surface of the iron-based soft magnetic powder, and the fluororesin film is formed at the surface of the inorganic insulating film. Since the inorganic insulating film has a relatively high permittivity, an eddy current generated between particles in a high frequency range cannot be sufficiently reduced.

On the other hand, although the eddy current generated between the particles can be reduced by increasing a film thickness of the inorganic insulating film, in this case, a volume ratio of a soft magnetic material in the soft magnetic core is decreased. As a result, a magnetic permeability of the soft magnetic core decreases, and it becomes difficult to reduce a size of the soft magnetic core.

SUMMARY

An insulator-coated soft magnetic powder according to an application example of the present disclosure contains: a soft magnetic powder; and an insulating film with which a particle surface of the soft magnetic powder is coated and which contains a fluorine compound, in which an average particle diameter of the soft magnetic powder is 1 μm or more and 15 μm or less, an average thickness of the insulating film is 5 nm or more and 50 nm or less, and a relative permittivity of the fluorine compound is 5.0 or less.

A method for producing an insulator-coated soft magnetic powder according to an application example of the present disclosure includes: producing an insulator-coated soft magnetic powder by, mixing a soft magnetic powder and a fluorine compound powder containing a fluorine compound, and mechanically attaching the fluorine compound powder to a particle surface of the soft magnetic powder so as to form an insulating film with which the particle surface of the soft magnetic powder is coated, in which an average particle diameter of the insulator-coated soft magnetic powder is 1 μm or more and 15 μm or less, an average thickness of the insulating film is 5 nm or more and 50 nm or less, and a relative permittivity of the fluorine compound is 5.0 or less.

A method for producing an insulator-coated soft magnetic powder according to an application example of the present disclosure includes: producing an insulator-coated soft magnetic powder by, causing a polymerization reaction of a fluorine-containing gas as a monomer gas to form an insulating film which contains a fluorine compound and with which a particle surface of a soft magnetic powder is coated, in which an average particle diameter of the insulator-coated soft magnetic powder is 1 μm or more and 15 μm or less, an average thickness of the insulating film is 5 nm or more and 50 nm or less, and a relative permittivity of the fluorine compound is 5.0 or less.

A method for producing an insulator-coated soft magnetic powder according to an application example of the present disclosure includes: producing an insulator-coated soft magnetic powder by, polymerizing a fluorine compound precursor containing a fluorine atom by a sol-gel method to form an insulating film which contains a fluorine compound and with which a particle surface of a soft magnetic powder is coated, in which an average particle diameter of the insulator-coated soft magnetic powder is 1 μm or more and 15 μm or less, an average thickness of the insulating film is 5 nm or more and 50 nm or less, and a relative permittivity of the fluorine compound is 5.0 or less.

A dust core according to an application example of the present disclosure contains: the insulator-coated soft magnetic powder according to the application example of the present disclosure.

A magnetic element according to an application example of the present disclosure includes: the dust core according to the application example of the present disclosure.

An electronic device according to an application example of the present disclosure includes: the magnetic element according to the application example of the present disclosure.

A vehicle according to an application example of the present disclosure includes: the magnetic element according to the application example of the present disclosure.

DESCRIPTION OF EXEMPLARY EMBODIMENTS

Hereinafter, an insulator-coated soft magnetic powder, a method for producing an insulator-coated soft magnetic powder, a dust core, a magnetic element, an electronic device, and a vehicle according to the present disclosure will be described in detail with reference to the accompanying drawings.

1. Insulator-Coated Soft Magnetic Powder

Figure 1:
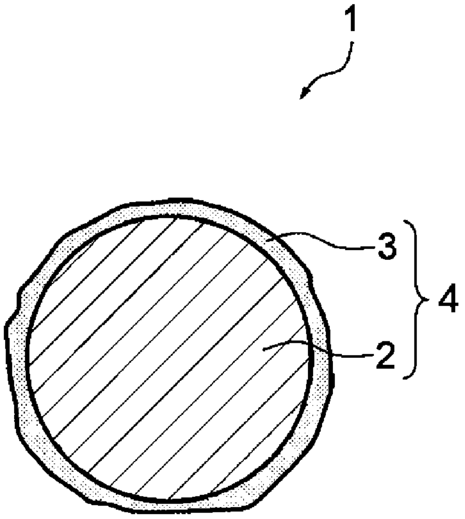
FIG. 1 is a cross-sectional view schematically showing one particle of an insulator-coated soft magnetic powder according to an embodiment.

First, an insulator-coated soft magnetic powder according to an embodiment will be described. FIG. 1 is a cross-sectional view schematically showing one particle of an insulator-coated soft magnetic powder 1 according to the embodiment. In the following description, the one particle of the insulator-coated soft magnetic powder 1 is also referred to as an "insulator-coated soft magnetic particle 4".

The insulator-coated soft magnetic particle 4 shown in FIG. 1 includes a soft magnetic particle 2 and an insulating film 3 provided at a surface of the soft magnetic particle 2. Among these, the soft magnetic particle 2 contains a soft magnetic material to be described later. The insulating film 3 is provided to coat the surface of the soft magnetic particle 2, and has insulating properties. The term "coat" as used herein refers to a concept that includes a state in which a part of the surface of the soft magnetic particle 2 is covered, as well as a state in which the entire surface of the soft magnetic particle 2 is covered. In addition, in the following description, an aggregate of the soft magnetic particles 2 is also referred to as a "soft magnetic powder".

As will be described later, a dust core obtained by compacting the insulator-coated soft magnetic powder 1 has a high degree of insulation between particles. Accordingly, in a magnetic element including the dust core, an eddy current loss can be reduced. As a result, the insulator-coated soft magnetic powder 1 contributes to implementation of a magnetic element having a low loss (core loss) in a high frequency range.

1.1. Soft Magnetic Particle

As described above, the soft magnetic particle 2 contains the soft magnetic material. Examples of the soft magnetic material include a material containing at least one of Fe, Ni, and Co as a main component, that is, containing 50% or more of such elements in terms of an atomic ratio. In addition, depending on intended characteristics, the soft magnetic material may contain at least one selected from the group consisting of Cr, Nb, Cu, Al, Mn, Mo, Si, Sn, B, C, P, Ti, and Zr, in addition to the elements serving as the main component. In addition, the soft magnetic material may contain inevitable impurities as long as effects of the present embodiment are not impaired. The inevitable impurities are impurities that are unintentionally mixed in a raw material or during production. The inevitable impurities include all elements other than the above-described elements, and examples thereof include O, N, S, Na, Mg, and K.

Specific examples of the soft magnetic material include various alloys, such as Fe-based alloys such as Fe—Si-based alloys (such as silicon steel), Fe—Si—Al-based alloys (such as Sendust), Fe—Ni-based, Fe—Co-based, Fe—Ni—Co-based, Fe—Si—B-based, Fe—Si—B—C-based, Fe—Si—B—Cr—C-based, Fe—Si—Cr-based, Fe—B-based, Fe—P—C-based, Fe—Co—Si—B-based, Fe—Si—B—Nb-based, Fe—Si—B—Nb—Cu-based, Fe—Zr—B-based, Fe—Cr-based, and Fe—Cr—Al-based alloys, Ni-based alloys such as Ni—Si—B-based and Ni—P—B-based alloys, and Co-based alloys such as Co—Si—B-based alloys.

By using the soft magnetic material having such a composition, the insulator-coated soft magnetic particle 4 that has a high magnetic permeability, magnetic flux density, and the like and a low coercive force can be obtained.

A content of the main component described above in the soft magnetic material is preferably 50% or more, and more preferably 70% or more in terms of an atomic ratio. Accordingly, magnetic properties such as a magnetic permeability and a magnetic flux density of the insulator-coated soft magnetic particle 4 can be particularly improved.

A structure constituting the soft magnetic material is not particularly limited, and may be any one of a crystalline structure, a non-crystalline structure (amorphous structure), and a microcrystalline structure (nanocrystalline structure). Among these, the soft magnetic material preferably contains an amorphous or microcrystalline material. By containing the amorphous or microcrystalline material, the coercive force is decreased, which also contributes to reduction in hysteresis loss of the magnetic element. In the soft magnetic material, structures having different crystallinities may be mixed.

Examples of the amorphous material and the microcrystalline material include Fe-based alloys such as Fe—Si—B-based, Fe—Si—B—C-based, Fe—Si—B—Cr—C-based, Fe—Si—Cr-based, Fe—B-based, Fe—P—C-based, Fe—Co—Si—B-based, Fe—Si—B—Nb-based, Fe—Si—B—Nb—Cu-based, and Fe—Zr—B-based alloys, Ni-based alloys such as Ni—Si—B-based and Ni—P—B-based alloys, and Co-based alloys such as Co—Si—B-based alloys.

The composition of the soft magnetic material is identified by the following analysis method.

Examples of the analysis method include: iron and steel—atomic absorption spectrometric method defined in JIS G 1257:2000; iron and steel—ICP atomic emission spectrometric method defined in JIS G 1258:2007; iron and steel—method for spark discharge atomic emission spectrometric analysis defined in JIS G 1253:2002; iron and steel—method for X-ray fluorescence spectrometric analysis defined in JIS G 1256:1997; and gravimetric, titration, and absorption spectrometric methods defined in JIS G 1211 to G 1237.

Specific examples of a spectrometer include a solid atomic emission spectrometer manufactured by SPECTRO, in particular, a spark discharge atomic emission spectrometer, model: SPECTROLAB, type: LAVMB08A, and an ICP device CIROS120 type manufactured by Rigaku Corporation.

In particular, when C (carbon) and S (sulfur) are identified, an infrared absorption method after combustion in a current of oxygen (combustion in high frequency induction furnace) defined in JIS G 1211:2011 is also used. Specific examples of an analyzer thereof include a carbon-sulfur analyzer CS-200 manufactured by LECO Corporation.

In particular, when N (nitrogen) and O (oxygen) are identified, iron and steel—methods for determination of nitrogen content defined in JIS G 1228:1997 and general rules for determination of oxygen in metallic materials defined in JIS Z 2613:2006 are also used. Specific examples of an analyzer thereof include an oxygen-nitrogen analyzer, TC-300/EF-300 manufactured by LECO Corporation.

In a particle size distribution of the soft magnetic powder on a volume basis, when a particle diameter with a 50% cumulative frequency is defined as an average particle diameter, an average particle diameter of the soft magnetic powder is 1 μm or more and 15 μm or less. When the average particle diameter of the soft magnetic powder is within the above range, an in-particle eddy current path in the soft magnetic particle 2 is shortened, and thus an eddy current loss of the magnetic element in a high frequency range can be sufficiently reduced. In addition, when the average particle diameter of the soft magnetic powder is within the above range, a filling property during compaction is increased, and thus magnetic properties such as a magnetic permeability and a saturation magnetic flux density of the magnetic element can be improved.

When the average particle diameter of the soft magnetic powder is less than the lower limit value, aggregation is likely to occur, formation of the insulating film 3 becomes difficult, and the filling property during compaction may decrease. Accordingly, secondary particles are generated, and an eddy current loss derived from eddy currents between particles increases. On the other hand, when the average particle diameter of the soft magnetic powder exceeds the upper limit value, the in-particle eddy current path is long, and thus the eddy current loss derived from the in-particle eddy currents increases.

In addition, the average particle diameter of the soft magnetic powder is more preferably 2 μm or more and 12 μm or less, and still more preferably 3 μm or more and 9 μm or less.

The particle size distribution of the soft magnetic powder on a volume basis can be obtained by, for example, a laser diffraction method.

1.2. Insulating Film

The surface of the soft magnetic particle 2 is coated with the insulating film 3. The insulating film 3 contains a fluorine compound. The fluorine compound is characterized by having a low relative permittivity. In the dust core formed by compacting the insulator-coated soft magnetic powder 1, a value of a capacitive reactance R can be increased by decreasing the relative permittivity of the insulating film 3. The capacitive reactance R is represented by the following equation (1).

$$R=1/(2\pi fC) \quad (1)$$

In the above equation (1), f is a frequency at which the insulator-coated soft magnetic powder 1 is used, and C is a capacitance of a system through the insulating film 3. In addition, C is represented by the following equation (2).

$$C=Sk/d \quad (2)$$

In the above equation (2), S is a surface area of the soft magnetic particle 2, k is a permittivity of the insulating film 3, and d is a film thickness of the insulating film 3.

If the capacitive reactance R can be increased, an eddy current flowing between the insulator-coated soft magnetic powders 1 when a current flows through the magnetic element including the dust core can be reduced. Accordingly, the eddy current loss can be reduced, so that performance of the magnetic element can be improved.

From the above equations (1) and (2), if the permittivity k of the insulating film 3 can be decreased, the capacitance C can be decreased without changing the surface area S of the soft magnetic particle 2 or the film thickness d of the insulating film 3. Accordingly, the capacitive reactance R can be increased.

In order to decrease the capacitance C, it is conceivable to decrease the surface area S or increase the film thickness d. However, in order to decrease the surface area S, it is necessary to further decrease a particle diameter of the soft magnetic particle 2. In this case, a filling ratio of the soft magnetic particles 2 in the dust core tends to decrease, which may lead to a decrease in magnetic properties such as a magnetic permeability and a saturation magnetic flux density. In addition, when the film thickness d is increased, occupancy of the soft magnetic particles 2 in the dust core is relatively decreased, which may lead to a decrease in the magnetic properties. Therefore, by decreasing the permittivity k of the insulating film 3, the eddy current loss can be reduced without decreasing the magnetic properties of the dust core.

When the insulating film 3 contains the fluorine compound, the permittivity can be decreased without decreasing insulating properties of the insulating film 3. Accordingly, the eddy current loss can be reduced without decreasing a DC insulation breakdown voltage of the dust core.

The fluorine compound is a compound having a low relative permittivity as described above, and the relative permittivity is preferably 5.0 or less, more preferably 3.0 or less, and still more preferably 2.5 or less. Accordingly, the permittivity k of the insulating film 3 can be sufficiently decreased. The relative permittivity of the fluorine compound is obtained by a method defined in JIS K 6935-2: 1999. In addition, a measurement frequency thereof is 1 MHz.

In addition, since the fluorine compound has a low surface tension, the fluorine compound has excellent hydrophobicity. Therefore, the insulator-coated soft magnetic powder 1 has excellent moisture resistance, and thus can reduce rusting of the soft magnetic particle 2 caused by moisture absorption.

The fluorine compound is not particularly limited as long as the compound contains a fluorine atom. Examples of the fluorine compound include various fluororesins such as fully fluorinated resins such as polytetrafluoroethylene resin (PTFE), partially fluorinated resins such as polyvinylidene fluoride (PVF) and polychlorotrifluoroethylene (PCTFE), and copolymers such as a tetrafluoroethylene-perfluoroalkyl vinyl ether resin (PFA), a fluorinated ethylene propylene resin (FEP), a hexafluoride ethylene propylene resin (PFEP), and an ethylene/tetrafluoroethylene copolymer (E/TFE), and one or a mixture of two or more thereof is used.

In addition, the fluorine compound may be a coupling agent containing a fluorine atom, a compound derived from a metal alkoxide containing a fluorine atom, a polymer of a monomer gas containing a fluorine atom, or the like. Examples of the coupling agent containing a fluorine atom include fluoroalkylsilane and fluoroarylsilane. The metal alkoxide and the monomer gas are as described later.

In addition, since the fluorine compound has a low Young's modulus, there is an advantage that a coverage of the fluorine compound on the surface of soft magnetic particle 2 is easily increased. Therefore, the insulating film 3 containing the fluorine compound has excellent insulating properties even when the film thickness thereof is small, and has a low permittivity, which contributes to implementation of a magnetic element having a particularly low eddy current loss. Further, the low Young's modulus promotes optimization of positions of the insulator-coated soft magnetic particles 4 when compacting the insulator-coated soft magnetic powder 1, which contributes to an increase in a filling ratio. Therefore, a magnetic element having excellent magnetic properties can be obtained.

The Young's modulus of the fluorine compound is preferably 3.0 GPa or less, more preferably 0.05 GPa or more and 2.0 GPa or less, and still more preferably 0.1 GPa or more and 1.0 GPa or less. By using the fluorine compound having such a Young's modulus, a coverage of the insulating film 3 with respect to the surface of the soft magnetic particle 2 can be particularly increased, and it is easy to make the film thickness of the insulating film 3 more uniform. Accordingly, a filling ratio of the soft magnetic powder in the dust core can be further increased. When the Young's modulus exceeds the upper limit value, rigidity of the insulating film 3 is increased, and thus the insulating film 3 may easily be peeled off. On the other hand, the Young's modulus may be lower than the lower limit value, but the rigidity of the insulating film 3 is too low, so that the insulating film 3 may be cut off during compaction depending on the thickness of the insulating film 3 and a shape of the soft magnetic particle 2.

The insulating film 3 may contain a component other than the fluorine compound. Examples of the component other than the fluorine compound include an organic material other than the fluorine compound, an inorganic material such as a glass material or a ceramic material. A content of the component other than the fluorine compound in the insulating film 3 is preferably 30 mass % or less, and more preferably 10 mass % or less.

In addition, the insulating film 3 may include a plurality of layers as long as the insulating film 3 includes a layer containing the fluorine compound. From the viewpoint of easy delamination between layers and difficulty in reducing the film thickness, it is preferable that the insulating film 3 is a single layer.

An average thickness of the insulating film 3 is preferably 5 nm or more and 50 nm or less, more preferably 10 nm or more and 40 nm or less, and still more preferably 15 nm or more and 30 nm or less. Accordingly, the filling ratio of the soft magnetic powder in the dust core can be increased while the insulating properties of the insulating film 3 are sufficiently ensured. When the average thickness of the insulating film 3 is less than the lower limit value, the insulating properties of the insulating film 3 may be insufficient depending on a constituent material of the insulating film 3. On the other hand, when the average thickness of the insulating film 3 exceeds the upper limit value, the insulating film 3 may easily be peeled off, or the filling ratio of the soft magnetic powder in the dust core may decrease depending on the constituent material of the insulating film 3.

The average thickness of the insulating film 3 is measured, for example, by observing a cross section of the insulator-coated soft magnetic particle 4 in an enlarged manner. Specifically, the insulator-coated soft magnetic particle 4 is cut by a focused ion beam to prepare a thin section sample. Next, the obtained thin section sample is observed with a scanning transmission electron microscope, and the thickness of the insulating film 3 is measured at five or more positions for one particle. Then, measured values are averaged, and a calculation result thereof is taken as the average thickness of the insulating film 3. A range of the insulating film 3 can be confirmed by, for example, energy-dispersive X-ray spectroscopy (EDX analysis) or Auger electron spectroscopy measurement.

In addition, it is preferable that a surface of the insulating film 3 is subjected to a hydrophilization treatment. By performing the hydrophilization treatment, dispersibility of the insulator-coated soft magnetic powder 1 in an organic binder is improved. Accordingly, when the dust core is obtained by compacting the insulator-coated soft magnetic powder 1 together with the organic binder, a filling ratio of the insulator-coated soft magnetic powder 1 can be increased. As a result, a magnetic element having excellent magnetic properties can be implemented.

On the surface of the insulating film 3 subjected to the hydrophilization treatment, it is conceivable that a hydroxy group is introduced instead of a fluorine atom contained in the fluorine compound. It is conceivable that this hydroxy group provides hydrophilicity. Examples of the hydrophilization treatment include a plasma treatment, an ozone treatment, a corona treatment, and an ultraviolet irradiation treatment. In particular, it is preferable that the plasma treatment or the ozone treatment is used. Accordingly, the hydrophilization can be efficiently performed at a high density. Examples of a treatment gas in the plasma treatment include water vapor, oxygen, argon, and nitrogen.

The coverage of the insulating film 3 on the surface of the soft magnetic particle 2 is preferably 40% or more, and more preferably 60% or more and 95% or less. Accordingly, when the insulator-coated soft magnetic powder 1 is compacted, a probability that the soft magnetic particles 2 are insulated from each other by the insulating films 3 is sufficiently high. Therefore, setting the coverage within the above range contributes to implementation of a magnetic element having a particularly low eddy current loss. Although the coverage may exceed the upper limit value, the coverage is preferably equal to or less than the upper limit value from the viewpoint of making the insulating properties between the particles sufficient and enabling easy production of the insulator-coated soft magnetic powder 1 that has a stable coverage.

The coverage of the insulating film 3 can be identified by a surface-sensitive elemental analysis method such as elemental analysis using an X-ray photoelectron spectroscopy (XPS) method. Specifically, a ratio of elements inherent in the soft magnetic particle 2 is measured by elemental analysis using an XPS method on a surface of the insulator-coated soft magnetic particle 4. Next, the insulating film 3 is removed by a treatment of removing the insulating film 3. Examples of this treatment include a liquid phase treatment using a liquid for dissolving the insulating film 3, and a gas phase treatment for decomposing and removing the insulating film 3. By removing the insulating film 3, the surface of the soft magnetic particle 2 is exposed. Next, the surface of the soft magnetic particle 2 is again subjected to elemental analysis using an XPS method, and the ratio of elements inherent in the soft magnetic particle 2 is calculated. Here, as an example, it is assumed that a ratio of Si is measured based on a peak area ratio of a Si2p peak obtained by the elemental analysis using the XPS method. Then, when the ratio of Si after the treatment is set as 100, a relative value X of the ratio of Si before the treatment is calculated. Then, a value of 100−X corresponds to an amount of Si of the soft magnetic particle 2 coated with the insulating film 3. As a result, 100−X can be the coverage of the insulating film 3.

1.3. Effects of Present Embodiment

As described above, the insulator-coated soft magnetic powder 1 according to the present embodiment contains the soft magnetic powder and the insulating film 3 with which the particle surface of the soft magnetic powder (the surface of the soft magnetic particle 2) is coated and which contains the fluorine compound. The average particle diameter of the soft magnetic powder is 1 μm or more and 15 μm or less, and the average thickness of the insulating film 3 is 5 nm or more and 50 nm or less. In addition, the relative permittivity of the fluorine compound is 5.0 or less.

According to such a configuration, since the soft magnetic powder has a sufficiently small diameter, the in-particle eddy current path of the soft magnetic particle 2 can be shortened. In addition, the insulating properties of the insulating film 3 can be sufficiently ensured without increasing the film thickness of the insulating film 3. Accordingly, the filling ratio of the soft magnetic powder in the dust core can be increased while inter-particle eddy currents are reduced. As a result, the eddy current loss of the magnetic element in a high frequency range can be reduced, and magnetic properties such as a magnetic permeability can be improved. That is, it is possible to obtain the insulator-coated soft magnetic powder 1 from which such a magnetic element can be produced.

In addition, it is particularly preferable that the fluorine compound is PTFE or PFA. These fluorine compounds have a particularly low relative permittivity and a low Young's modulus. By using the fluorine compound having a low Young's modulus, it is easy to increase a coverage of the fluorine compound on the surface of the soft magnetic particle 2. Therefore, the insulating film 3 containing these fluorine compounds has excellent insulating properties even though the film thickness thereof is small, and has a low permittivity, which contributes to implementation of a magnetic element having a particularly low eddy current loss.

In addition, as described above, the Young's modulus of the fluorine compound is preferably 3.0 GPa or less. Accordingly, the coverage of the insulating film 3 on the surface of the soft magnetic particle 2 can be particularly increased, and the film thickness of the insulating film 3 can be more easily made uniform. Accordingly, the filling ratio of the soft magnetic powder in the dust core can be further increased.

In addition, it is preferable that the surface of the insulating film 3 is subjected to a hydrophilization treatment. Accordingly, the dispersibility of the insulator-coated soft magnetic powder 1 in the organic binder is improved. As a result, when the dust core is obtained by compacting the insulator-coated soft magnetic powder 1 together with an organic binder, the filling ratio of the insulator-coated soft magnetic powder 1 can be increased.

In addition, the coverage of the insulating film 3 is preferably 40% or more as described above. Accordingly, when the insulator-coated soft magnetic powder 1 is compacted, a probability that the soft magnetic particles 2 are insulated from each other by the insulating films 3 can be sufficiently increased.

2. Method for Producing Insulator-Coated Soft Magnetic Powder

Next, a method for producing the insulator-coated soft magnetic powder according to the embodiment will be described.

Figure 2:
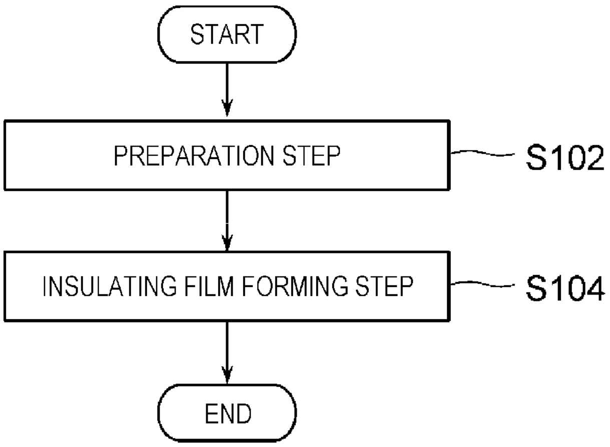
FIG. 2 is a process diagram showing a method for producing the insulator-coated soft magnetic powder according to the embodiment.

FIG. 2 is a process diagram showing the method for producing the insulator-coated soft magnetic powder according to the embodiment.

The method for producing the insulator-coated soft magnetic powder shown in FIG. 2 includes a preparation step S102 and an insulating film forming step S104.

2.1. Preparation Step

In the preparation step S102, a soft magnetic powder is prepared. The soft magnetic powder may be a powder produced by any method. Examples of the production method include various atomization methods such as a water atomization method, a gas atomization method, and a rotary water flow atomization method, and a reduction method, a carbonylation method, and a pulverization method. Among these, an atomization method is preferably used. That is, the soft magnetic powder is preferably an atomized powder. The atomized powder is minute, has high sphericity, and has high production efficiency. In particular, since a water atomized powder or a rotary water flow atomized powder is produced by contact between a molten metal and water, there is a thin oxide film on a surface thereof. This oxide film can serve as a base of the insulating film 3. Therefore, it is possible to obtain the insulator-coated soft magnetic particles 4 that have excellent adhesion between the soft magnetic particles 2 and the insulating films 3 and finally have particularly high insulating properties between particles. In addition, since a cooling rate is high, it is also possible to produce a soft magnetic powder containing an amorphous structure or a microcrystalline structure.

When a commercially available soft magnetic powder or the like is procured, this step can be omitted.

2.2. Insulating Film Forming Step

In the insulating film forming step S104, the insulating film 3 with which the surface of the soft magnetic particle 2 is coated is formed. Accordingly, the insulator-coated soft magnetic powder 1 is obtained.

A method for forming the insulating film 3 is not particularly limited, and examples thereof include dry forming methods such as a mechanochemical method, a plasma polymerization method, an atomic layer deposition (ALD) method, a chemical vapor deposition (CVD) method, and an ion plating method, and wet forming methods such as a sol-gel method and an electrolytic reduction method.

Hereinafter, the mechanochemical method, the plasma polymerization method, and the sol-gel method will be sequentially described as representatives.

2.2.1. Mechanochemical Method

The mechanochemical method is a method in which mechanical stress is applied to a particle to change physicochemical properties of the particle. For example, when mechanical interaction (mechanochemical reaction) is caused between the soft magnetic particle 2 and a raw material of the insulating film 3 by using a mechanochemical reaction device that includes a compression tool and a blade therein and a cylindrical chamber rotating at a high speed, the insulating film 3 can be formed at the surface of the soft magnetic particle 2. Therefore, the mechanochemical method is used as a coating film forming method. Specifically, first, the soft magnetic particle 2 and the raw material of the insulating film 3 are charged into the chamber. Examples of the raw material of the insulating film 3 include a fluorine compound powder and other additives. When the chamber is rotated, these charged materials collide with each other or are pressed against an inner wall of the chamber. As a result, the raw material of the insulating film 3 is pressed against the surface of the soft magnetic particle 2 to form a film. In this way, the insulator-coated soft magnetic particle 4 is obtained. In addition, by using such a mechanical film forming method, even when a contaminant adheres to the surface of the soft magnetic particle 2, when an adhesion force is low, or when surface roughness is low, the insulating film 3 can be favorably adhered. Further, since the soft magnetic particle 2 does not undergo any high temperature state in the process of forming the insulating film 3, thermal denaturation of the soft magnetic particle 2, for example, unintended crystal coarsening can be prevented. Accordingly, it is possible to prevent a decrease in soft magnetism of the soft magnetic particle 2.

As described above, the fluorine compound has a Young's modulus lower than that of other resin materials and inorganic materials. Therefore, by using the mechanochemical method, the insulating film 3 that is thin and has a high coverage can be efficiently formed.

Examples of the mechanochemical reaction device include a "Nobilta" (registered trademark) pulverizer and a "Mechanofusion" (registered trademark) pulverizer manufactured by Hosokawa Micron Ltd., and a "Hybridizer" (registered trademark) pulverizer manufactured by Nara Machinery Co., Ltd.

An average particle diameter of the fluorine compound powder is not particularly limited, and is preferably 0.2 times or more and 5.0 times or less, more preferably 0.5 times or more and 2.0 times or less, and still more preferably 0.7 times or more and 1.5 times or less the average particle diameter of the soft magnetic powder. Accordingly, the soft magnetic powder and the fluorine compound powder are mixed more uniformly, and thus the film thickness of the insulating film 3 can be uniform.

In addition, the average particle diameter of the fluorine compound powder is preferably 0.1 μm or more and 100 μm or less, more preferably 3 μm or more and 50 μm or less, and still more preferably 5 μm or more and 10 μm or less.

The average particle diameter of the fluorine compound powder is a particle diameter where a cumulative frequency from a small diameter side is 50% in a particle size distribution on a volume basis obtained by a laser diffraction method.

An amount of the raw material of the insulating film 3 to be charged is appropriately adjusted according to the film thickness of the insulating film 3 to be formed. As an example, the amount of the raw material of the insulating film 3 to be charged is preferably 0.1 mass % or more, and more preferably 0.4 mass % or more of the soft magnetic powder. Even when the amount of the raw material of the insulating film 3 is large, an upper limit value thereof may not be particularly set since the raw material adhering to the surface of the soft magnetic particle 2 is limited. However, in consideration of the fact that energy of mixing is reliably transmitted to the surface of the soft magnetic particle 2, the amount of the raw material of the insulating film 3 to be charged is preferably 3.0 mass % or less, and more preferably 1.0 mass % or less of the soft magnetic powder.

As described above, the method for producing the insulator-coated soft magnetic powder according to the present embodiment includes the insulating film forming step S104 in which the mechanochemical reaction is used. In the insulating film forming step S104 of the present embodiment, the soft magnetic powder and the fluorine compound powder that contains the fluorine compound are mixed, and the fluorine compound powder is mechanically adhered to the particle surface of the soft magnetic powder (the surface of the soft magnetic particle 2). Accordingly, the insulating film 3 with which the particle surface of the soft magnetic powder is coated is formed, and the insulator-coated soft magnetic powder 1 is produced. The average particle diameter of the insulator-coated soft magnetic powder 1 is 1 μm or more and 15 μm or less, the average thickness of the insulating film 3 is 5 nm or more and 50 nm or less, and the relative permittivity of the fluorine compound is 5.0 or less.

According to such a production method, since the mechanochemical reaction is used, even when a contaminant adheres to the surface of the soft magnetic particle 2, when an adhesion force is low, or when surface roughness is low, the insulating film 3 can be favorably adhered. Further, since the soft magnetic particle 2 does not undergo any high temperature state in the process of forming the insulating film 3, thermal denaturation of the soft magnetic particle 2, for example, unintended crystal coarsening can be prevented. Therefore, according to the present production method, it is possible to efficiently produce the insulator-coated soft magnetic powder 1 capable of reducing the eddy current loss of the magnetic element in a high frequency range and improving magnetic properties such as a magnetic permeability.

2.2.2. Plasma Polymerization Method

The plasma polymerization method is a method of forming a film by generating plasma discharge in a state in which a monomer gas is introduced and depositing a polymer on a surface of an object to be treated.

A fluorine-containing gas is used as the monomer gas. Examples of the fluorine-containing gas include a $CHF_3$ gas, a $C_4F_8$ gas, a $C_4F_{10}$ gas, and Fluorinert (registered trademark). Examples of the Fluorinert include $C_5F_{12}$, $C_6F_{14}$, and $C_7F_{16}$. When the Fluorinert is a liquid, the Fluorinert is gasified and used.

In addition, an additive gas (crosslinking gas) serving as a crosslinking agent may be used. The crosslinking gas crosslinks monomers in the process of plasma polymerization. Therefore, the crosslinking gas is preferably added when a molecular weight of the monomer gas is high. By adding the crosslinking gas, even when the monomer gas moves slowly and a probability of reaction occurrence at an active site is low, it is possible to compensate for the above circumstances, and it is possible to promote the plasma polymerization. Examples of the crosslinking gas include a fluoroalkane gas having 3 or less carbon atoms. Specific examples thereof include a $CF_4$ gas, a $C_2F_5$ gas, and a $C_3F_8$ gas.

When a gas having a double bond in a molecule, such as a $C_4F_8$ gas, is used as the monomer gas, or when activity of the monomer gas is high, the addition of the crosslinking gas may be omitted.

Further, examples of a discharge gas include rare gases such as He and Ar, and a nitrogen gas.

In addition, examples of the additive gas used in the polymerization reaction include hydrocarbon gases such as methane, ethane, propane, and butane, halogen, oxygen, hydrogen, $NF_3$, $SF_6$, and $CF_4$.

Components other than the monomer gas may be added as necessary, and may be omitted.

When these gases are introduced into a chamber of a plasma polymerization device and plasma discharge is generated, the monomer gas reaches the surface of the soft magnetic particle 2 that is the object to be treated. Then, a polymerization reaction occurs in the monomer gas due to an active species contained in the plasma, and the insulating film 3 is formed.

A driving force for causing the polymerization reaction in the monomer gas is not limited to the plasma discharge, and may also be, for example, ultraviolet irradiation. However, the plasma discharge is preferable from the viewpoint that the insulating film 3 can thus be formed to be dense. Since the dense insulating film 3 is hard, the insulating film 3 is not easily broken even when the insulating film 3 is thin. Therefore, the insulating properties of the insulating film 3 can be further improved.

As described above, the method for producing the insulator-coated soft magnetic powder according to the present embodiment includes the insulating film forming step S104 in which the plasma polymerization method is used. In the insulating film forming step S104 of the present embodiment, the insulator-coated soft magnetic powder 1 is produced by causing the polymerization reaction of the fluorine-containing gas as the monomer gas to form the insulating film 3 which contains the fluorine compound and with which the particle surface of the soft magnetic powder (the surface of the soft magnetic particle 2) is coated. The average particle diameter of the insulator-coated soft magnetic powder 1 is 1 μm or more and 15 μm or less, the average thickness of the insulating film 3 is 5 nm or more and 50 nm or less, and the relative permittivity of the fluorine compound is 5.0 or less.

According to such a production method, since the plasma polymerization method is used, it is possible to form the insulating film 3 that is more dense and hard. Therefore, the insulating film 3 that has excellent insulating properties even when the insulating film 3 is thin can be obtained. In addition, since the film can be formed from the monomer gas directly on the surface of the soft magnetic particle 2, the method has relatively high efficiency among vapor phase film forming methods. Therefore, according to the present production method, it is possible to efficiently produce the insulator-coated soft magnetic powder 1 capable of reducing the eddy current loss in a high frequency range of the magnetic element and improving magnetic properties such as a magnetic permeability.

2.2.3. Sol-Gel Method

The sol-gel method is a liquid phase film forming method in which a film is formed by polymerization of a fluorine compound precursor in a liquid.

Examples of the fluorine compound precursor include a coupling agent containing a fluorine atom and a metal alkoxide containing a fluorine atom. The metal alkoxide includes a silicon alkoxide. Among these, the coupling agent containing a fluorine atom is preferably used since the coupling agent enables a stable reaction.

The coupling agent containing a fluorine atom is a compound having a fluorine-containing group and 1 to 3 hydrolyzable groups.

Examples of the fluorine-containing group include a fluoroalkyl group, a perfluoroalkyl group, a fluoroaryl group, and a perfluoroaryl group. Specific examples thereof include the following organic groups.

$F(CF_2)_u$—
$(CF_3)_2CF(CF_2)_v$—
$CF_3(CF_2)_2O(CF(CF_3)CF_2O)_wCF(CF_3)$—
$F(CF_2)_{u-1}O(CF_2)_2$—
$CF_3(CF_2)_2O(CF(CF_3)CF_2)_{w+1}O(CF_2)_2$—

In the above organic groups, u is 1 to 21, v is 0 to 18, and w is 1 to 5. In addition, in the above organic groups, fluorine atoms may be partially substituted with a hydrogen atom or a chlorine atom.

In addition, in the case of a linear perfluoroalkyl group ($F(CF_2)_u$—), in particular, u is preferably 4 to 12, and more preferably 6 to 10. Accordingly, chemical stability of the coupling agent can be improved.

Examples of the hydrolyzable group include an alkoxy group, an acyloxy group, an aryloxy group, an aminooxy group, an amide group, a ketoxime group, an isocyanate group, and a halogen atom. Among these, an alkoxy group is preferably used.

Examples of the coupling agent include a silane coupling agent, a titanium coupling agent, an aluminum coupling agent, and a zirconium coupling agent, and a silane coupling agent is preferably used.

In addition, examples of the metal alkoxide containing a fluorine atom include trifluoropropyltrimethoxysilane, nonafluorohexyltrimethoxysilane, and heptadecafluorodecatrimethoxysilane.

The metal alkoxide is preferably monofunctional, bifunctional, or trifunctional, and more preferably bifunctional or trifunctional. Here, for example, "bifunctional" means that the number of alkoxide groups is 2 moles per mole of the metal alkoxide.

Such a fluorine compound precursor and such a soft magnetic powder are dispersed in a dispersion medium to prepare a dispersion. Examples of the dispersion medium include lower alcohols such as ethanol and methanol, and fluorine-based liquids such as Fluorinert (registered trademark), and a fluorine-based liquid is preferably used to uniformly disperse the fluorine compound precursor. An amount of the dispersion medium used with respect to 1 part by mass of the fluorine compound precursor is, for example, 10 parts by mass or more and 50 parts by mass or less. In addition, an amount of the fluorine compound precursor added to 1 part by mass of the soft magnetic powder is, for example, about 0.01 parts by mass or more and 0.1 parts by mass or less.

Instead of the method of preparing the dispersion, a method of bringing a mixture of the fluorine compound precursor and the dispersion medium into contact with the soft magnetic powder may be used.

Next, pH of the dispersion is adjusted and then the dispersion is stirred. The pH is adjusted to 9 to 13, for example. An alkaline solution such as aqua ammonia or a sodium hydroxide aqueous solution can be used as a pH adjusting agent. With the stirring, hydrolysis occurs in the hydrolyzable group of the fluorine compound precursor, and the hydrolyzable group is converted into, for example, a silanol. The silanols obtained by conversion react with each other and cause dehydration, thereby forming the insulating film 3.

Before or after the alkaline solution is mixed, an ultrasonic wave may be emitted thereto. By performing such ultrasonic irradiation, uniform dispersion of the soft magnetic powder can be promoted, and the insulating film 3 can be formed more uniformly on the particle surface. In addition, an order in which the alkaline solution is added is not limited to the above order, and timing of the addition may be different.

Further, after the insulating film 3 is formed, the obtained insulator-coated soft magnetic powder may be subjected to a heat treatment as necessary. Conditions in the heat treatment are, for example, a temperature of 60° C. or higher and 120° C. or lower and a time of 10 minutes or longer and 300 minutes or shorter. Accordingly, a hydrate remaining on the insulating film 3 can be removed and thus adhesion of the insulating film 3 can be improved.

As described above, the method for producing the insulator-coated soft magnetic powder according to the present embodiment includes the insulating film forming step S104 in which the sol-gel method is used. In the insulating film forming step S104 of the present embodiment, the insulator-coated soft magnetic powder 1 is produced by polymerizing the fluorine compound precursor containing a fluorine atom by the sol-gel method to form the insulating film 3 which contains the fluorine compound and with which the particle surface of the soft magnetic powder (the surface of the soft magnetic particle 2) is coated. The average particle diameter of the insulator-coated soft magnetic powder 1 is 1 μm or more and 15 μm or less, the average thickness of the insulating film 3 is 5 nm or more and 50 nm or less, and the relative permittivity of the fluorine compound is 5.0 or less.

According to such a production method, since the sol-gel method is used, the insulating film 3 that has a high coverage and a high density can be formed by self-assembly of the fluorine compound precursor. Therefore, the insulating film 3 that has excellent insulating properties even when the insulating film 3 is thin can be obtained. Therefore, according to the present production method, it is possible to efficiently produce the insulator-coated soft magnetic powder 1 capable of reducing the eddy current loss of the magnetic element in a high frequency range and improving magnetic properties such as a magnetic permeability.

3. Dust Core and Magnetic Element

Next, the dust core and the magnetic element according to the embodiment will be described.

The magnetic element according to the embodiment can be applied to various magnetic elements that include a magnetic core, such as a choke coil, an inductor, a noise filter, a reactor, a transformer, a motor, an actuator, an electromagnetic valve, and a generator. In addition, the dust core according to the embodiment can be applied to the magnetic core included in these magnetic elements.

Hereinafter, two types of coil components will be representatively described as an example of the magnetic element.

3.1. Toroidal Type

First, a toroidal type coil component that is an example of the magnetic element according to the embodiment will be described.

Figure 3:
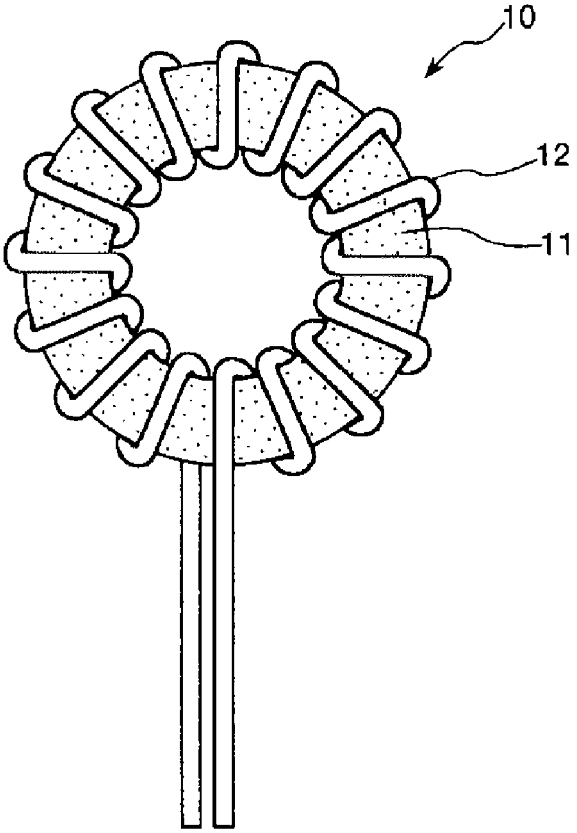
FIG. 3 is a plan view schematically showing a toroidal type coil component.

FIG. 3 is a plan view schematically showing the toroidal type coil component.

A coil component 10 shown in FIG. 3 includes a ring-shaped dust core 11 and a conductive wire 12 wound around the dust core 11. Such a coil component 10 is generally referred to as a toroidal coil.

The dust core 11 is obtained by mixing the insulator-coated soft magnetic powder according to the embodiment and a bonding material, supplying the obtained mixture to a mold, pressing and molding the mixture. That is, the dust core 11 is a powder compact containing the insulator-coated soft magnetic powder according to the embodiment. Such a dust core 11 can implement a magnetic element in which filling properties of the insulator-coated soft magnetic powder are favorable and in which an eddy current loss is low when used in a high frequency range. Therefore, the coil component 10 including the dust core 11 has a low eddy current loss and high magnetic properties such as a magnetic permeability and a magnetic flux density. As a result, when the coil component 10 is mounted on an electronic device or the like, power consumption of the electronic device or the like can be reduced, and performance improvement and size reduction can be achieved.

Examples of a constituent material of the bonding material used in production of the dust core 11 include organic materials such as silicone-based resins, epoxy-based resins, phenol-based resins, polyamide-based resins, polyimide-based resins, and polyphenylene sulfide-based resins, and inorganic materials such as phosphates such as magnesium phosphate, calcium phosphate, zinc phosphate, manganese phosphate, and cadmium phosphate, and silicates such as sodium silicate. In particular, a thermosetting polyimide or an epoxy-based resin is preferable. These resin materials are easily cured by being heated and have excellent heat resistance. Therefore, ease of producing the dust core 11 and heat resistance thereof can be improved. The bonding material may be added as necessary, and may be omitted.

In addition, a ratio of the bonding material to the insulator-coated soft magnetic powder slightly varies depending on target magnetic properties and mechanical properties, an allowable eddy current loss and the like of the dust core 11 to be produced, and is preferably about 0.5 mass % or more and 5.0 mass % or less, and more preferably about 1.0 mass % or more and 3.0 mass % or less. Accordingly, the coil component 10 having excellent magnetic properties can be obtained while particles of the insulator-coated soft magnetic powder are sufficiently bound to each other.

If necessary, various additives may be added to the mixture for any purpose.

Examples of a constituent material of the conductive wire 12 include materials having high conductivity, for example, metal materials containing Cu, Al, Ag, Au, and Ni. In addition, an insulating film is provided on a surface of the conductive wire 12 as necessary.

A shape of the dust core 11 is not limited to the ring shape shown in FIG. 3, and may be, for example, a shape in which a part of a ring is missing, a shape whose shape in a longitudinal direction is linear, a sheet shape, or a film shape.

In addition, the dust core 11 may contain a soft magnetic powder other than the insulator-coated soft magnetic powder according to the above-described embodiment or a non-magnetic powder as necessary.

3.2. Closed Magnetic Circuit Type

Next, a closed magnetic circuit type coil component that is an example of the magnetic element according to the embodiment will be described.

Figure 4:
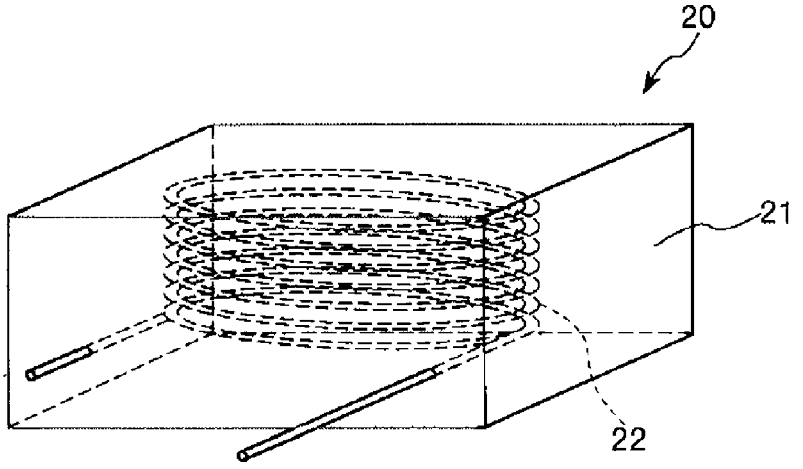
FIG. 4 is a transparent perspective view schematically showing a closed magnetic circuit type coil component.

FIG. 4 is a transparent perspective view schematically showing the closed magnetic circuit type coil component.

Hereinafter, the closed magnetic circuit type coil component will be described, and, in the following description, differences from the toroidal type coil component will be mainly described, and description of the same matters will be omitted.

As shown in FIG. 4, a coil component 20 according to the present embodiment is formed by embedding a conductive wire 22 formed in a coil shape inside a dust core 21. That is, the coil component 20 that is a magnetic element includes the dust core 21 containing the above-described insulator-coated soft magnetic powder, and is formed by molding the conductive wire 22 with the dust core 21. The dust core 21 has the same configuration as that of the dust core 11 described above. Accordingly, the coil component 20 that has a low eddy current loss and excellent magnetic properties can be implemented.

The coil component 20 in such a form can be easily obtained with a relatively small size. In addition, the coil component 20 has high magnetic properties and a low eddy current loss. Therefore, when the coil component 20 is mounted on an electronic device or the like, power consumption of the electronic device or the like can be reduced, and performance improvement and size reduction can be achieved.

In addition, since the conductive wire 22 is embedded in the dust core 21, a gap is less likely to be formed between the conductive wire 22 and the dust core 21. Therefore, vibration caused by magnetostriction of the dust core 21 can be prevented, and generation of noise due to the vibration can also be prevented.

A shape of the dust core 21 is not limited to the shape shown in FIG. 4, and may be a sheet shape, a film shape, or the like.

In addition, the dust core 21 may contain a soft magnetic powder other than the insulator-coated soft magnetic powder according to the above-described embodiment or a non-magnetic powder as necessary.

4. Electronic Device

Next, the electronic device including the magnetic element according to the embodiment will be described with reference to FIGS. 5 to 7.

Figure 5:
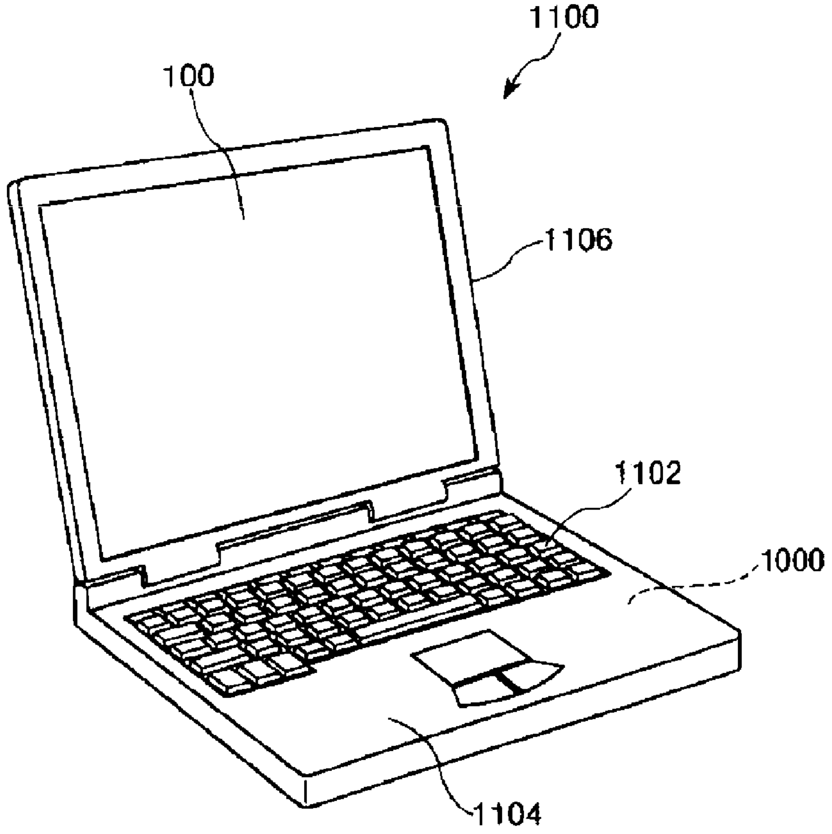
FIG. 5 is a perspective view showing a mobile personal computer, which is an electronic device including a magnetic element according to the embodiment.

FIG. 5 is a perspective view showing a mobile personal computer that is the electronic device including the magnetic element according to the embodiment. A personal computer 1100 shown in FIG. 5 includes a body portion 1104 including a keyboard 1102, and a display unit 1106 including a display portion 100. The display unit 1106 is supported via a hinge structure so as to be pivotable with respect to the body portion 1104. Such a personal computer 1100 includes therein a magnetic element 1000 such as a choke coil, an inductor, or a motor for a switching power supply.

Figure 6:
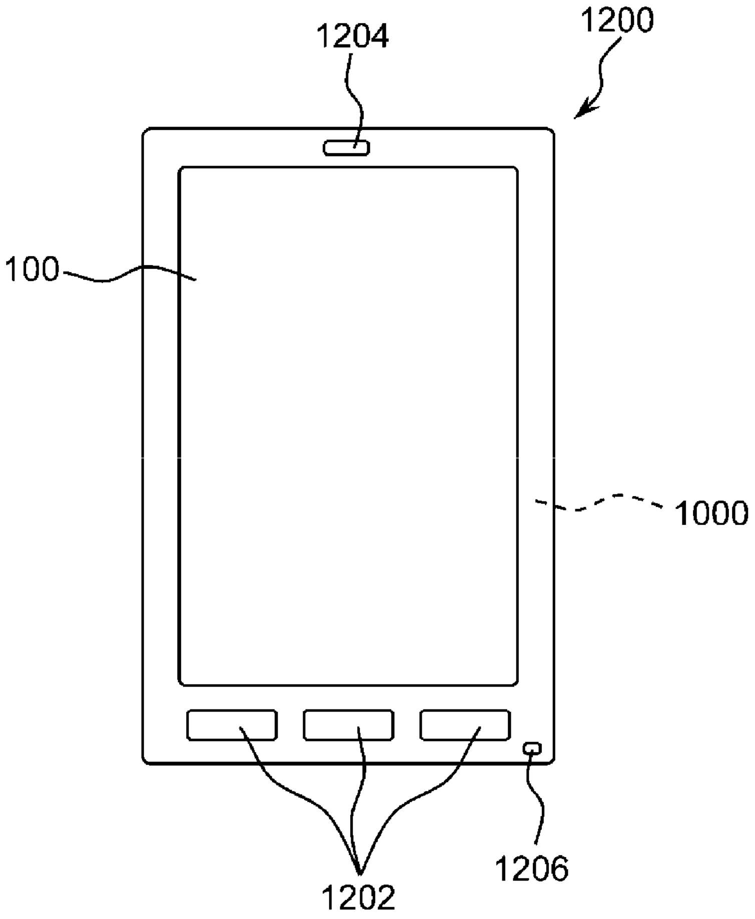
FIG. 6 is a plan view showing a smartphone, which is an electronic device including the magnetic element according to the embodiment.

FIG. 6 is a plan view showing a smartphone that is the electronic device including the magnetic element according to the embodiment. A smartphone 1200 shown in FIG. 6 includes a plurality of operation buttons 1202, an earpiece 1204, and a mouthpiece 1206. In addition, the display portion 100 is disposed between the operation buttons 1202 and the earpiece 1204. Such a smartphone 1200 includes therein the magnetic element 1000 such as an inductor, a noise filter, or a motor.

Figure 7:
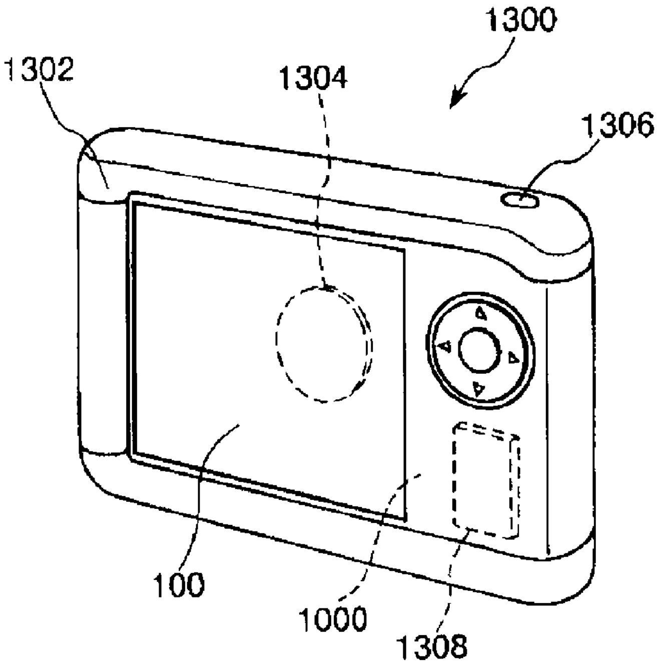
FIG. 7 is a perspective view showing a digital still camera, which is an electronic device including the magnetic element according to the embodiment.

FIG. 7 is a perspective view showing a digital still camera that is the electronic device including the magnetic element according to the embodiment. A digital still camera 1300 photoelectrically converts an optical image of a subject by an imaging element such as a charge coupled device (CCD) so as to generate an imaging signal.

The digital still camera 1300 shown in FIG. 7 includes the display portion 100 provided on a rear surface of a case 1302. The display portion 100 functions as a finder that displays the subject as an electronic image. In addition, a light receiving unit 1304 including an optical lens, a CCD, or the like is provided on a front surface side of the case 1302, that is, on a back surface side in the drawing.

When a photographer confirms a subject image displayed on the display portion 100 and presses a shutter button 1306, a CCD imaging signal at that time is transferred to and stored in a memory 1308. Such a digital still camera 1300 also includes therein the magnetic element 1000 such as an inductor or a noise filter.

Examples of the electronic device according to the embodiment include, in addition to the personal computer in FIG. 5, the smartphone in FIG. 6, and the digital still camera in FIG. 7, a mobile phone, a tablet terminal, a watch, an ink jet discharge device such as an ink jet printer, a laptop personal computer, a television, a video camera, a video tape recorder, a car navigation device, a pager, an electronic notebook, an electronic dictionary, a calculator, an electronic game device, a word processor, a workstation, a videophone, a crime prevention television monitor, electronic binoculars, a POS terminal, medical devices such as an electronic thermometer, a blood pressure meter, a blood glucose meter, an electrocardiogram measuring device, an ultrasonic diagnostic device, or an electronic endoscope, a fish finder, various measuring devices, instruments for a vehicle, an aircraft, and a ship, vehicle control devices such as an automobile control device, an aircraft control device, a railway vehicle control device, or a ship control device, and a flight simulator.

As described above, such an electronic device includes the magnetic element according to the embodiment. Accordingly, effects of the magnetic element, that is, a low eddy current loss in a high frequency range and a high magnetic permeability can be provided, and performance improvement and size reduction of the electronic device can be implemented.

5. Vehicle

Next, a vehicle including the magnetic element according to the present embodiment will be described with reference to FIG. 8.

Figure 8:
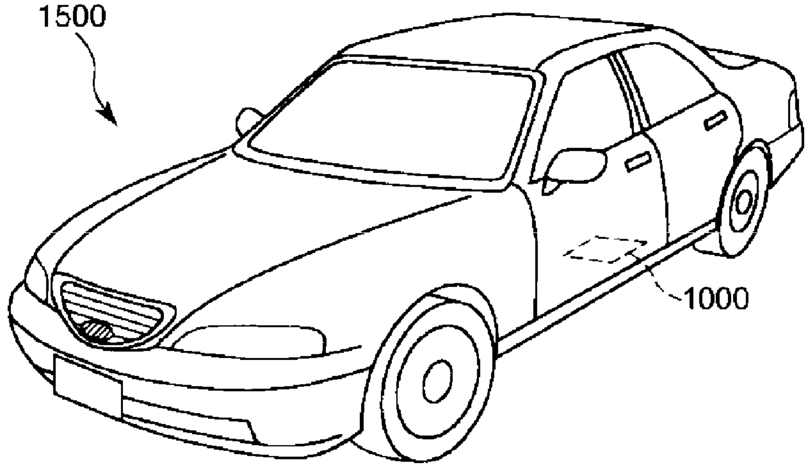
FIG. 8 is a perspective view showing an automobile, which is a vehicle including the magnetic element according to the embodiment.

FIG. 8 is a perspective view showing an automobile that is the vehicle including the magnetic element according to the embodiment.

An automobile 1500 includes therein the magnetic element 1000. Specifically, the magnetic element 1000 is provided in various automobile components including an electronic control unit (ECU) such as a car navigation system, an anti-lock brake system (ABS), an engine control unit, a battery control unit of a hybrid automobile or an electric automobile, a vehicle body posture control system, and an automatic driving system, and a driving motor, a generator, and an air conditioning unit.

As described above, such a vehicle includes the magnetic element according to the embodiment. Accordingly, the effects of the magnetic element, that is, a low eddy current loss in a high frequency range and a high magnetic permeability can be provided, and performance improvement and size reduction of the device mounted on the vehicle can be achieved.

The vehicle according to the present embodiment may be, for example, a two-wheeled vehicle, a bicycle, an aircraft, a helicopter, a drone, a ship, a submarine, a railway vehicle, a rocket, or a spacecraft, in addition to the automobile shown in FIG. 8.

Although the insulator-coated soft magnetic powder, the method for producing the insulator-coated soft magnetic powder, the dust core, the magnetic element, the electronic device, and the vehicle according to the present disclosure have been described above based on the preferred embodiment, the present disclosure is not limited thereto.

For example, although a powder compact such as the dust core is described as an application example of the insulator-coated soft magnetic powder according to the present disclosure in the above embodiment, the application example is not limited thereto. Alternatively, the application example of the insulator-coated soft magnetic powder according to the present disclosure may also be a magnetic device such as a magnetic fluid, a magnetic head, or a magnetic shielding sheet. In addition, shapes of the dust core and the magnetic element are not limited to those shown in the drawings, and may be any shapes.

Further, the method for producing the insulator-coated soft magnetic powder according to the present disclosure may be a method in which a step for any purpose as desired is added to the above-described embodiment.

EXAMPLES

Next, specific examples of the present disclosure will be described.

6. Preparation of Insulator-Coated Soft Magnetic Powder

6.1. Example 1

First, an amorphous alloy soft magnetic powder having a composition represented by a composition formula $Fe_{73.0}Cr_{2.2}Si_{11.1}B_{10.8}C_{2.9}$ on an atomic ratio basis was prepared by a water atomization method. Next, the obtained soft magnetic powder was subjected to an ozone treatment. Next, a particle size distribution on a volume basis of the ozone-treated soft magnetic powder was obtained by a laser diffraction scattering particle size distribution measurement device. Then, an average particle diameter was calculated based on the obtained particle size distribution. A calculation result is shown in Table 1.

Next, an insulating film of a fluorine compound having an average thickness of 20 nm was formed at a particle surface of the soft magnetic powder by the following method so as to obtain an insulator-coated soft magnetic powder.

In the method of forming the insulating film, first, 300 g of the soft magnetic powder and a fluorine compound powder were charged into a chamber of a mechanochemical reaction device. PTFE powder L-5 manufactured by Daikin Industries, Ltd. was used as the fluorine compound powder. In addition, an addition ratio of the fluorine compound powder was 0.76 mass % of the soft magnetic powder. Then, a mechanochemical reaction was caused between the soft magnetic powder and the fluorine compound powder by the mechanochemical reaction device. Accordingly, the insulator-coated soft magnetic powder was obtained. Reaction conditions in the mechanochemical reaction were a rotation speed of 2000 rpm and a reaction time of 5 minutes.

6.2. Examples 2 to 8

An insulator-coated soft magnetic powder was obtained in the same manner as in Example 1 except that production conditions of the insulator-coated soft magnetic powder were changed as shown in Table 1.

6.3. Comparative Example 1

An insulator-coated soft magnetic powder was obtained in the same manner as in Example 1 except that a glass powder was used instead of the fluorine compound powder.

6.4. Comparative Examples 2 to 4

An insulator-coated soft magnetic powder was obtained in the same manner as in Example 1 except that production conditions of the insulator-coated soft magnetic powder were changed as shown in Table 1.

6.5. Example 9

First, an amorphous alloy soft magnetic powder having a composition represented by a composition formula $Fe_{73.0}Cr_{2.2}Si_{11.1}B_{10.8}C_{2.9}$ on an atomic ratio basis was prepared by a water atomization method. A particle size distribution on a volume basis of the obtained soft magnetic powder was obtained by a laser diffraction scattering particle size distribution measurement device. Then, an average particle diameter was calculated based on the obtained particle size distribution. A calculation result is shown in Table 2.

Next, the obtained soft magnetic powder was subjected to an ozone treatment.

Next, 50 mg of trifluoropropyltrimethoxysilane as a fluorine compound precursor was diluted 10 times by mass with Fluorinert (registered trademark) so as to prepare a treatment liquid. Then, the obtained treatment liquid was sprayed and brought into contact with 50 g of the soft magnetic powder.

Next, the soft magnetic powder sprayed with the treatment liquid was stirred while being heated to 100° C., dried, and then gradually cooled to room temperature by natural cooling. Accordingly, an insulating film was formed at a particle surface of the soft magnetic powder by a sol-gel method so as to obtain an insulator-coated soft magnetic powder.

6.6. Examples 10 and 11

An insulator-coated soft magnetic powder was obtained in the same manner as in Example 9 except that production conditions of the insulator-coated soft magnetic powder were changed as shown in Table 2.

Symbols of fluorine compound precursors shown in Table 2 correspond to the following substance names.

A-1: trifluoropropyltrimethoxysilane

A-2: nonafluorohexyltrimethoxysilane

A-3: heptadecafluorodecatrimethoxysilane

6.7. Example 12

An insulator-coated soft magnetic powder was obtained in the same manner as in Example 1 except that an insulating film was formed at a particle surface of the soft magnetic powder by plasma polymerization. A gas shown in Table 2 was used as a monomer gas as a raw material. In addition, an argon gas was used as a discharge gas.

6.8. Comparative Example 5

An insulator-coated soft magnetic powder was obtained in the same manner as in Example 9 except that an amount of the raw material use was reduced.

6.9. Comparative Example 6

An insulator-coated soft magnetic powder was obtained in the same manner as in Example 12 except that a time of film formation by plasma polymerization was reduced.

7. Evaluation of Insulation-Coated Soft Magnetic Powder 7.1. Average Thickness of Insulating Film A particle cross section of the insulator-coated soft magnetic powder of each of Examples and Comparative Examples was observed with an electron microscope. Then, an average thickness of the insulating film was calculated based on an observation result. Calculation results are shown in Tables 1 and 2.

7.2. DC Insulation Breakdown Voltage

A DC insulation breakdown voltage of the insulator-coated soft magnetic powder of each of Examples and Comparative Examples was measured at room temperature of 25° C. and a relative humidity of 45% by the following method.

First, an alumina-made cylinder having an inner diameter of 8 mm was filled with 0.15 g of the insulator-coated soft magnetic powder, and electrodes made of brass were disposed at both ends of the cylinder. Thereafter, a DC voltage of 50 V was applied between the electrodes for 2 seconds while a force of 20 kgf was applied to the insulator-coated soft magnetic powder by the electrodes at both ends of the cylinder by using a digital force gauge, and an electric resistance value between the electrodes was measured with a digital multimeter.

Next, while the DC voltage applied between the electrodes was increased by 50 V each time, the electric resistance value between the electrodes was measured each time, and presence or absence of breakdown was checked. Then, boosting and measurement of the electric resistance value were repeated until breakdown occurred. Then, the lowest DC voltage value when the breakdown occurred was obtained. A state in which the electric resistance value was 1 MΩ or less was regarded as breakdown. The above measurement was performed three times, and an average value of measured values thereof was defined as the DC insulation breakdown voltage. The obtained DC insulation breakdown voltages are shown in Tables 1 and 2. In addition, electric resistance values when 100 V is applied are also shown in Tables 1 and 2.

7.3. Coverage

A coverage of the insulating film of the insulator-coated soft magnetic powder of each of Examples and Comparative Examples was calculated by the method described above. Calculation results are shown in Tables 1 and 2.

7.4. Physical Properties of Insulating Film

Physical properties (relative permittivity and Young's modulus) of a constituent material of the insulating film used in the production of the insulator-coated soft magnetic powder of each of Examples and Comparative Examples are shown in Tables 1 and 2.

TABLE 1

| | Production condition of insulator-coated soft magnetic powder | | | | Evaluation result of insulator-coated soft magnetic powder | | | | Evaluation of physical properties of insulating film | |
|---|---|---|---|---|---|---|---|---|---|---|
| | Soft magnetic powder | Insulating film | | | | | | | Physical properties of constituent material | |
| | Average particle diameter µm | Constituent material — | Average particle diameter of fluororesin powder µm | Mechano-chemical reaction time minute | Average thickness of insulating film nm | DC insulation breakdown voltage V | Electric resistance value when 100 V is applied MΩ | Coverage of insulating film % | Relative permittivity — | Young's modulus GPa |
| Example 1 | 7 | PTFE | 6 | 5 | 20 | 183 | 3.0 | 65 | 2.0 | 0.5 |
| Example 2 | 7 | PTFE | 6 | 10 | 30 | 267 | 6.0 | 70 | 2.0 | 0.5 |
| Example 3 | 7 | PTFE | 20 | 10 | 15 | 150 | 2.5 | 50 | 2.0 | 0.5 |
| Example 4 | 7 | PTFE | 3 | 10 | 10 | 117 | 2.0 | 55 | 2.0 | 0.5 |
| Example 5 | 7 | PFA | 10 | 15 | 40 | 267 | 5.5 | 75 | 2.1 | 0.3 |
| Example 6 | 7 | PFA | 10 | 3 | 5 | 117 | 2.5 | 50 | 2.1 | 0.3 |
| Example 7 | 10 | PFA | 15 | 15 | 25 | 267 | 5.5 | 75 | 2.1 | 0.3 |
| Example 8 | 5 | FEP | 7 | 10 | 30 | 250 | 5.0 | 70 | 2.1 | 0.4 |
| Comparative Example 1 | 7 | Glass | 3 | 5 | 25 | 267 | 2.7 | 70 | 7.0 | 80 |
| Comparative Example 2 | 7 | PTFE | 6 | 1 | 2 | 50 | — | 30 | 2.0 | 0.5 |
| Comparative Example 3 | 7 | PFA | 10 | 0.5 | 1 | 50 | — | 20 | 2.1 | 0.3 |
| Comparative Example 4 | 7 | FEP | 7 | 1 | 2 | 50 | — | 30 | 2.1 | 0.4 |

TABLE 2

| | Production condition of insulator-coated soft magnetic powder | | | Evaluation result of insulator-coated soft magnetic powder | | | | Evaluation of physical properties of insulating film | |
|---|---|---|---|---|---|---|---|---|---|
| | Soft magnetic powder | Insulating film | | Average thickness of | DC insulation | Electric resistance | Coverage of | Physical properties of constituent material | |
| | Average particle diameter µm | Raw material — | Forming method — | insulating film Nm | breakdown voltage V | value when 100 V is applied MΩ | insulating film % | Relative permittivity — | Young's modulus GPa |
| Example 9 | 7 | A-1 | Sol-gel method | 20 | 183 | 3.0 | 65 | 2.0 | 0.5 |
| Example 10 | 7 | A-2 | Sol-gel method | 30 | 250 | 6.0 | 70 | 2.0 | 0.5 |
| Example 11 | 7 | A-3 | Sol-gel method | 15 | 267 | 5.0 | 65 | 2.0 | 0.5 |
| Example 12 | 7 | $C_4F_8$ gas | Plasma polymerization | 10 | 117 | 2.0 | 75 | 2.0 | 0.8 |
| Comparative Example 5 | 7 | A-1 | Sol-gel method | 2 | 50 | — | 15 | 2.0 | 0.5 |
| Comparative Example 6 | 7 | $C_4F_8$ gas | Plasma polymerization | 3 | 50 | — | 10 | 2.0 | 0.8 |

As shown in Tables 1 and 2, it is found that the DC insulation breakdown voltage of the insulator-coated soft magnetic powder of each of Examples is about the same as that of the insulator-coated soft magnetic powder of each of Comparative Examples as long as thicknesses and coverages of the insulating films are about the same. That is, it is found that the insulating film formed by using the fluorine compound has the same insulating properties as those of the insulating film formed by using the glass material in the related art.

On the other hand, the fluorine compound has a relative permittivity of about ⅓ or less of that of the glass material. Therefore, it can be said that the insulator-coated soft magnetic powder of each of Examples can particularly reduce generation of inter-particle eddy currents in a high frequency range as compared with the insulator-coated soft magnetic powder of each of Comparative Examples.

In addition, the fluorine compound has a Young's modulus of about 1/100 or less of that of the glass material. Therefore, it can be said that the insulator-coated soft magnetic powder of each of Examples is more likely to increase a filling ratio of soft magnetic particles at the time of compacting, and is more likely to increase magnetic properties of a magnetic element as compared with the insulator-coated soft magnetic powder of each of Comparative Examples.

Therefore, according to the present disclosure, it is clear that it is possible to obtain an insulator-coated soft magnetic powder from which a magnetic element having a low eddy current loss in a high frequency range and having a high magnetic permeability can be produced.

What is claimed is:

1. An insulator-coated soft magnetic powder comprising:

a soft magnetic powder; and a single-layer insulating film coated on the soft magnetic powder so as to directly contact the soft magnetic powder and which contains a fluorine compound and a glass material, wherein an average particle diameter of the soft magnetic powder is 1 µm or more and 15 µm or less, an average thickness of the insulating film is 5 nm or more and 50 nm or less, and a relative permittivity of the fluorine compound is 5.0 or less.

2. The insulator-coated soft magnetic powder according to claim 1, wherein the fluorine compound is PTFE or PFA.

3. The insulator-coated soft magnetic powder according to claim 1, wherein a surface of the insulating film is subjected to a hydrophilization treatment.

4. The insulator-coated soft magnetic powder according to claim 1, wherein a Young's modulus of the fluorine compound is 3.0 GPa or less.

5. The insulator-coated soft magnetic powder according to claim 1, wherein a coverage of the insulating film is 40% or more.

6. An insulator-coated soft magnetic powder comprising:

a soft magnetic powder; and an insulating film directly coated on the soft magnetic powder without sandwiching a metal oxide film between the soft magnetic powder and the insulating film, the insulating film containing a fluorine compound, wherein an average particle diameter of the soft magnetic powder is 1 µm or more and 15 µm or less, an average thickness of the insulating film is 5 nm or more and 50 nm or less, a relative permittivity of the fluorine compound is 5.0 or less, a coverage of the insulating film is 40% or more and 80% or less, a DC insulation breakdown voltage of the insulator-coated soft magnetic powder is 110 V or more and 270 V or less when 0.15 g of the insulator-coated soft magnetic powder is filled in a cylinder having an inner diameter of 8 mm.

7. The insulator-coated soft magnetic powder according to claim 1, wherein a DC insulation voltage of the insulator-coated soft magnetic powder is 117 [V] or more 267 [V] or less.

8. The insulator-coated soft magnetic powder according to claim 1, wherein an electrical resistance value of the insulator-coated soft magnetic powder is 2.0 [MΩ] or more 6.0 [MΩ] or less.

* * * * *